United States Patent [19]

Reese

[11] 3,996,811
[45] Dec. 14, 1976

[54] SPEED AND TORQUE SENSITIVE CLUTCH ASSEMBLY

[75] Inventor: Gerald D. Reese, Brooten, Minn.

[73] Assignee: Scorpion, Inc., Crosby, Minn.

[22] Filed: Jan. 7, 1974

[21] Appl. No.: 431,096

[52] U.S. Cl. .................. 74/230.17 E; 74/230.17 M
[51] Int. Cl.² ................... F16H 55/52; F16H 55/56
[58] Field of Search ........ 74/230.17 E, 230.17 M, 74/230.17 R, 230.17 A, 230.17 B; 192/105 C, 105 CP

[56] References Cited

UNITED STATES PATENTS

| | | | |
|---|---|---|---|
| 2,055,177 | 9/1936 | Lyman | 192/105 C |
| 2,254,177 | 8/1941 | Getchell | 74/230.17 M |
| 2,711,103 | 6/1955 | Miner | 74/230.17 M |
| 3,395,587 | 8/1968 | Casini | 74/230.17 M |
| 3,597,987 | 8/1971 | Kiekhaefer | 74/230.17 E |
| 3,665,781 | 5/1972 | Kawamura | 74/230.17 E |
| 3,727,478 | 4/1973 | Erickson et al. | 192/105 C |
| 3,786,688 | 1/1974 | Svenson | 74/230.17 M |
| 3,908,475 | 9/1975 | Takagi et al. | 74/230.17 E |

FOREIGN PATENTS OR APPLICATIONS

| | | | |
|---|---|---|---|
| 995,989 | 6/1965 | United Kingdom | 192/105 C |

*Primary Examiner*—Samuel Scott
*Assistant Examiner*—Allan R. Burke
*Attorney, Agent, or Firm*—Dugger, Johnson & Westman

[57] ABSTRACT

A clutch assembly for use with a V-belt drive which includes centrifugal weight means that tends to change the V-belt drive sheave setting to maintain a selected speed, and further includes a torsion spring and cam device operated to make the setting of the drive sheave partially responsive to the torque carried by the clutch.

9 Claims, 6 Drawing Figures

SPEED AND TORQUE SENSITIVE CLUTCH ASSEMBLY

BACKGROUND OF THE INVENTION

1. Field of the Invention.

The present invention relates to torque and speed sensitive clutches using a V-belt sheave for driving.

2. Prior Art.

A number of centrifugal clutches have been utilized with V-belt drives, for example, in mini-bikes and all terrain vehicles, and also in snowmobiles. The clutches will adjust the size of the V-belt drive sheave, or in other words the change of the diameter of the drive sheave or pulley, so that the higher the speed attained, the larger the effective drive sheave diameter becomes, and the clutch tends to act like a governor to keep the drive speed at a desired setting. Other clutches have used ramp members for adjustment of the effective driving diameter of a drive sheave, but the present device includes improvements in a clutch combining all of these features.

SUMMARY OF THE INVENTION

The present invention relates to a centrifugal clutch drive sheave for a V-belt drive used for powering vehicles or other devices through a V-belt. The clutch of the present invention includes centrifugal force or speed responsive means for adjusting the size of the drive sheave and also cam operators that are responsive to torque. The drive sheave has one side plate that is movable in respect to the other side plate to effect the size adjustment.

The speed response devices include weights on the ends of pivoting arms that tend to move the V-belt drive sheave to position wherein the effective driving diameter will increase as speed increases. Suitable wear shoes are provided on the arm to form shoes to reduce excessive wear at the area of contact of the arms and the movable plate of the sheave. Reducing wear increases the reliability of the clutches and reduces tendency of the actuators to "hang up". The movable portion of the sheave is axially slidable on a hub to which the stationary side plate is attached and also the movable plate is connected to the hub by a coil spring so it may rotate with respect to the stationary side plate, but is restrained by the spring.

Separate camming members are provided between the movable plate portion of the sheave and the hub, and these camming members are positioned so that as the torque increases and there is a tendency of the movable plate to rotate relative to the other side plate, the camming members will tend to change the size of the V-belt sheave as the relative rotation occurs. The torsion spring will resist the relative rotation. In this way the clutch is both speed and torque sensitive to give smooth efficient operation.

The device is made primarily for operation in vehicles, such as snowmobiles or the like but can be used for other applications where a V-belt drive is utilized, and a desire to get the maximum available power from the engine across a set speed range.

DESCRIPTION OF THE PREFERRED EMBODIMENT

Figure 1:
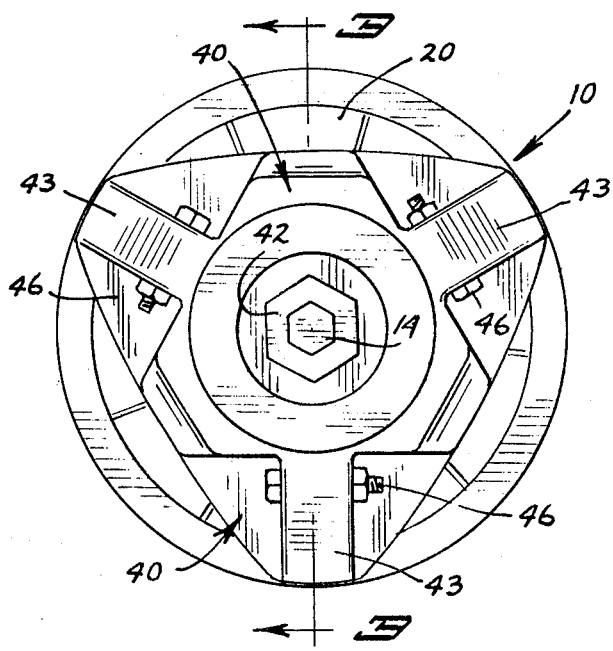
FIG. 1 is an end elevational view of a clutch made according to the present invention.
Figure 2:
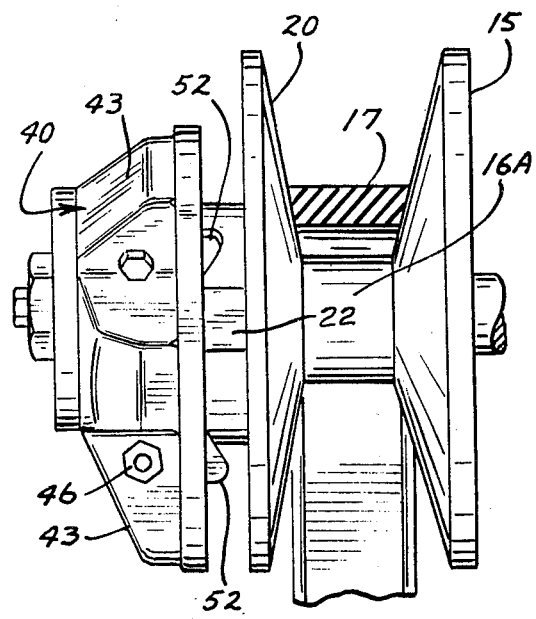
FIG. 2 is a side elevational view of the device of FIG. 1.

The clutch assembly illustrated generally at 10 is of the type used with a V-belt drive, and wherein the clutch assembly is mounted directly onto an engine output shaft 12. This type of a clutch is primarily used at the present time in snowmobiles and other similar vehicles, but can of course be used with any desired unit. The clutch generally drives a driven member which then is connected to the output drive for the vehicle. The clutch is of the type that is speed sensitive to the extent that it will permit the sheave to open and let the belt drop down onto the center portions of the hub in an engine idle position when the engine speed drops. As the engine speed picks up, the sheave side plates tend to move together, to first drive the belt with a small effective diameter sheave, and as the speed increases, the movable sheave side plates move toward the other plate to position wherein the effective drive diameter is increased to a maximum. This type of clutch is quite well known in the art, but has some limitations in previous devices in that wear has been a problem.

The clutch assembly 10 includes a main mounting hub illustrated generally at 11 that mounts onto the drive shaft 12 of an engine that is powered. The hub itself is drivably mounted relative to the drive shaft 12, and as can be seen, it can be mounted onto the drive shaft 12 with a suitable tapered surface 13. The shaft 12 has a taper as well that can be held against the inner taper by the use of a cap screw 14 acting through the clutch assembly pushing the tapered surfaces together. The hub 11 includes the stationary sheave side plate or portion 15. The stationary sheave plate comprises one half of a V-belt sheave and it is fixed to the hub, thus it is called herein the stationary side plate. The hub 12 itself also includes a center belt idler support section 16, which is of sufficient axially length in direction of the axis of rotation of the clutch to provide a support surface 16A not only for the V-belt 17 when the V-belt is in its lowermost position, but also provides a support of sufficient stability for a movable sheave side plate 20 that comprises the other half of the drive sheave and which engages the other side surface of the belt 17 from the stationary plate 15. The movable plate 20, as shown, includes an internal bushing 21 that mounts over the surface 16A of the hub portion 16. The movable sheave plate 20 is the movable part of the clutch, and it also includes a hub portion 22 that is concentric with the hub 11, and the hub 22 has an opening of size to fit over the hub 11.

At the outer end of the hub 11, that is the end opposite from the fixed sheave portion 15, the hub is turned down to form a smaller diameter portion indicated at 23. The hub 22 surrounds this outer end portion 23. The portion 23 joins the hub portion 16 at a shoulder 24, and a coil spring 25 is mounted over the hub portion 23. The coil spring 25 has an integral end projection or retainer 26 formed thereon at the end adjacent hub portion 16. The projection extends in axial direction of the hub, and protrudes into an opening defined in the shoulder 24 of the hub portion 16 so that the coil spring 25 is restrained from rotation with respect to the hub 25 at this end of the spring. In other words, the end of the spring adjacent the shoulder 24 is held from rotation by the projection 26 that enters a provided opening in the hub portion 16 at the shoulder.

Figure 3:
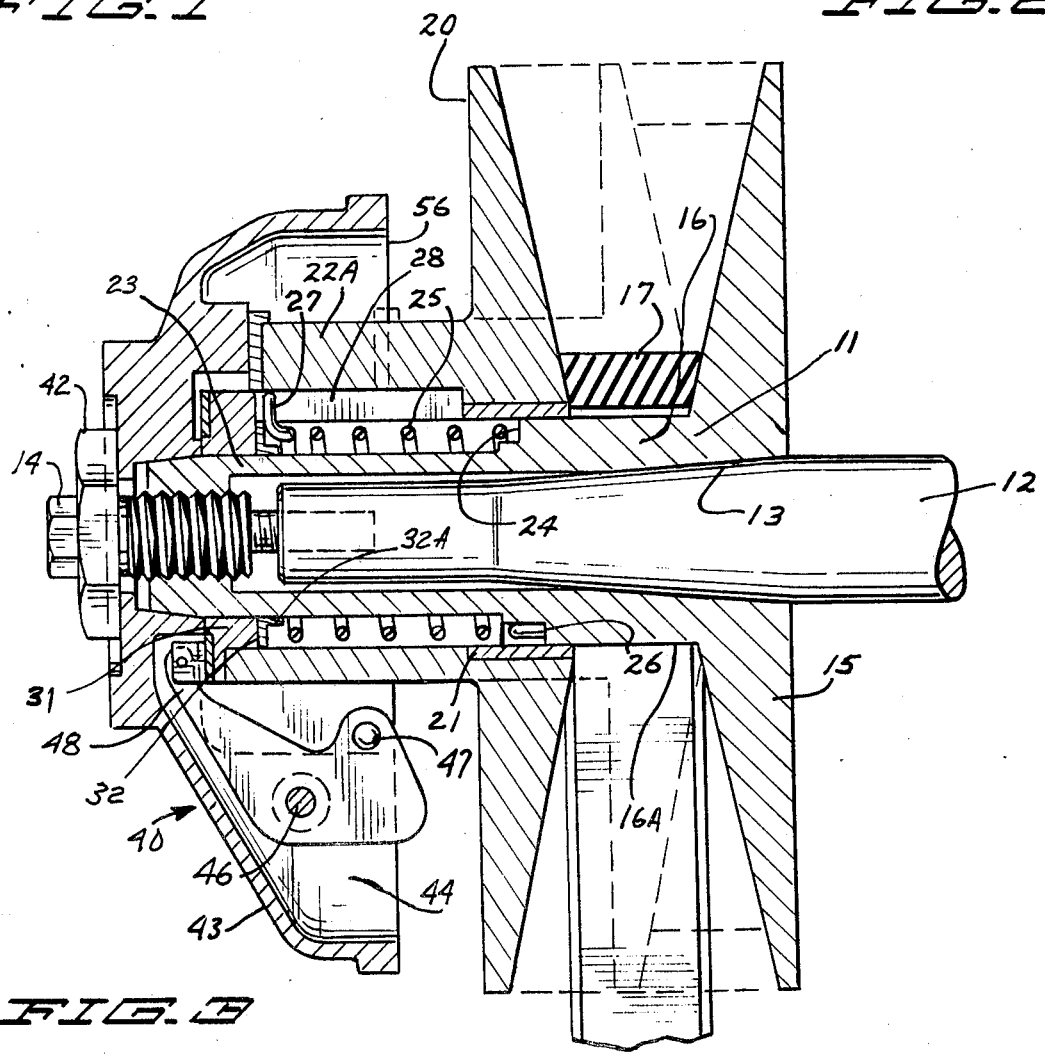
FIG. 3 is a sectional view taken as on line 3—3 in FIG. 1.
Figure 4:
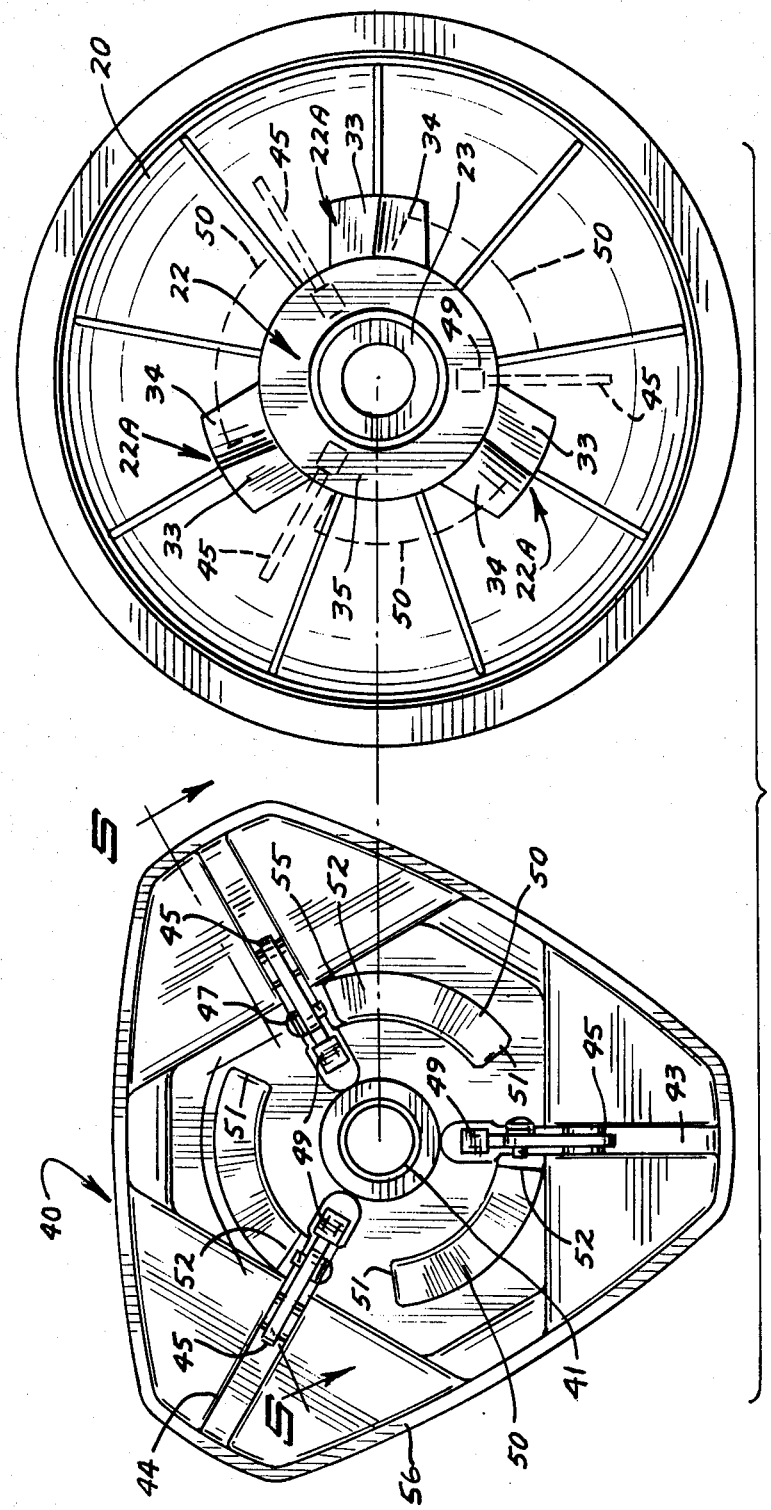
FIG. 4 is an exploded view of the device with a clutch cover shown folded open and illustrating inner working details of the clutch.

The opposite end of the coil spring 25 has a radially extending projection or finger 27 that extends outwardly from the coils of the spring 25 and projects up into an axially extending slot or groove 28 which is defined in the interior of the hub 22. This slot 28 is positioned under one of three axially extending exterior ribs or lugs 22A formed and raised from the outer surface of the hub 22. These lugs 22A are seen in FIG. 4 on the right hand side of the drawing, and the general diameter of the hub 22 is shown in the lower portion of FIG. 3. Thus, the radial finger 27 prevents the movable portion of the sheave from rotating with respect to the hub 11 unless a force is exerted on the spring 25. The movable portion, including the plate 20 can "wind" the spring up and rotate with respect to the fixed sheave plate 15, but it must overcome the resistance of the spring for such rotation.

The finger 27 of spring 25 will slide along the slot 28 and thus will permit the movable sheave 20 to move in and out in axial direction under axial forces, without substantially hindering this in and out movement.

However, the spring 25 does resist inward movement of the movable portion through different thrust carrying means as will be defined. The internal diameter of the bore through the hub 22 is of size to clear the coils of the spring 25, as shown. A thrust bearing assembly 31 is pressed into the interior bore of the hub 22 at the outer end thereof, and forms a backing member against which the spring 25 operates. A spring retainer and spacer washer 32 is also used. This spring retainer washer has a short sleeve section 32A that fits inside the inner surface of the coils of the spring 25 adjacent the outer end of the spring where the finger 27 is provided. The sleeve 32A prevents the coils of the spring 25 from tightening down onto the outer surface of hub portion 23 when the movable sheave 20 rotates with respect to the fixed sheave 15 which loads the spring in torsion. As was explained, the spring retainer 32 and sleeve 32A fit over the hub portion 23, and the sleeve extends inside the coils of the spring 25 a short distance. The spring end projection 26 at the opposite end of the spring merely slips into place in the provided opening in the shoulder 24 during assembly.

Figure 5:
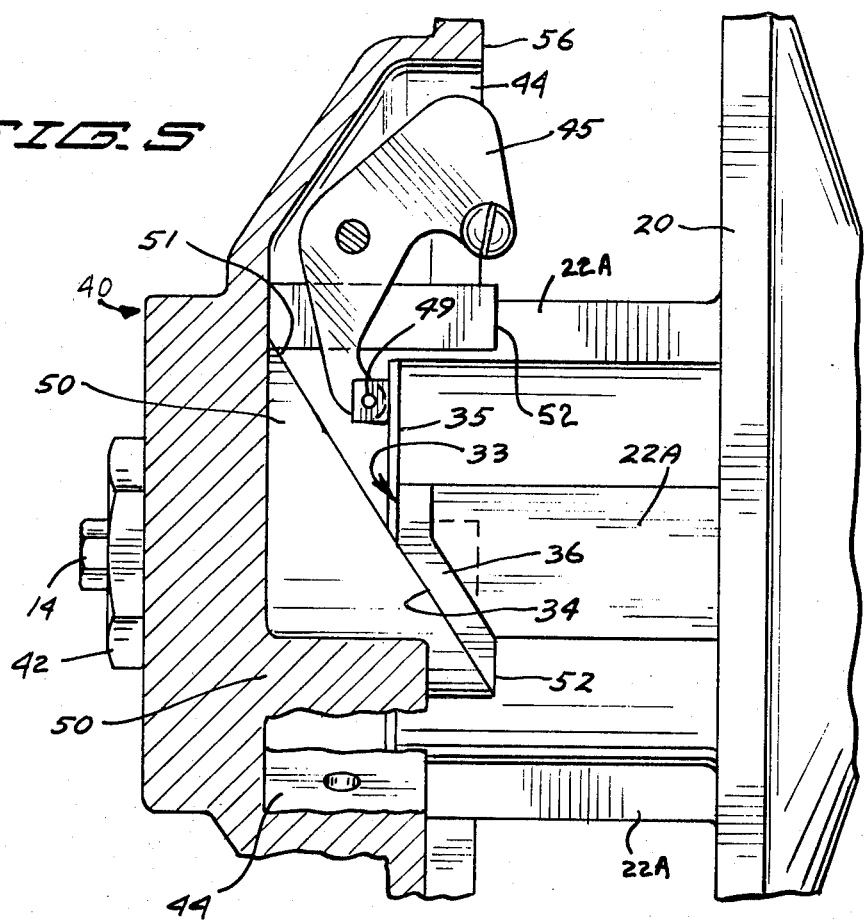
FIG. 5 is a sectional view taken as on line 5—5 in FIG. 4.
Figure 6:
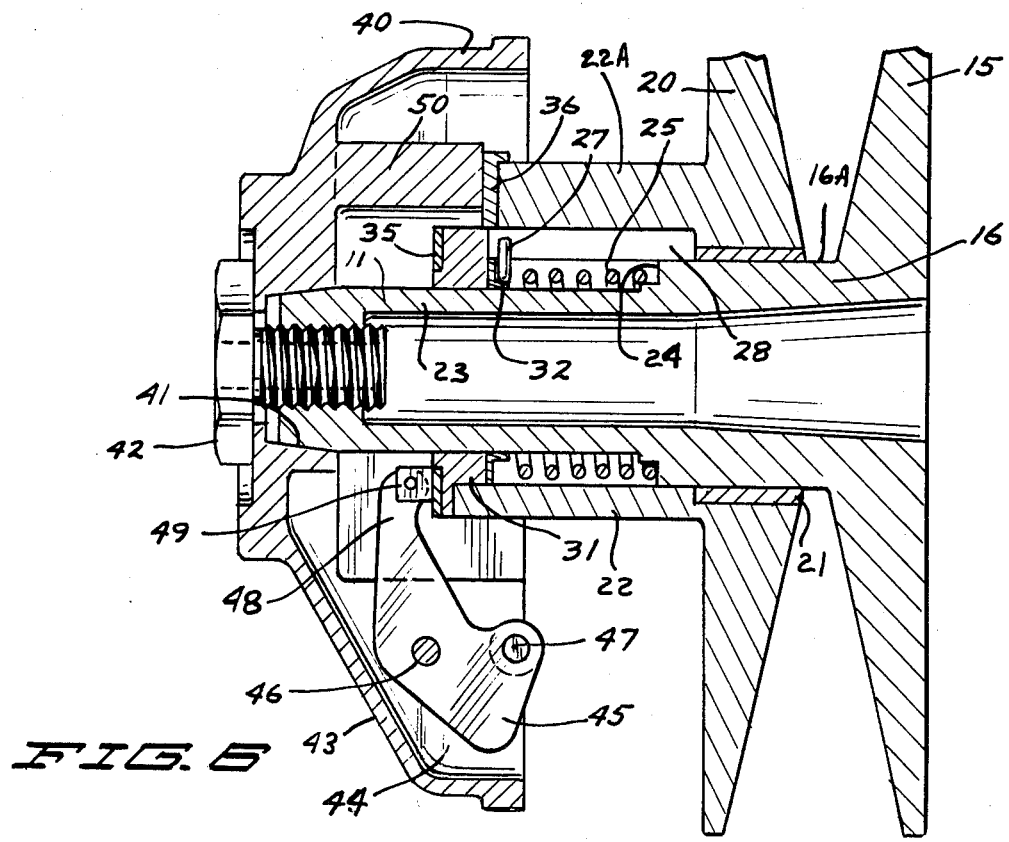
FIG. 6 is a view substantially the same as FIG. 3 showing the clutch in a high speed position.

The outer end surfaces of the ribs 22A, as shown at 33, generally, in FIG. 5, and also as seen in FIG. 4, have a surface portion that is perpendicular to the axis of rotation of the hub, and also have a second cam surface portion indicated generally at 34 that is inclined at an angle to the axis of rotation to form a ramping or cam surface that will provide axial movement for any surface moved rotationally relative to the hub and engaging on the surfaces 34. A co-operating cam surface is provided as part of a clutch cover. The clutch cover is as will be explained, held stationary relative to the hub 11 and thus relative rotation between the hub 22 and the clutch cover causes a change in axial position of the movable sheave plate. It is the surfaces 34 on the ends of the ribs 22A cooperating with the other cam surface that provides for adjustment of the movable sheave plate when the movable sheave plate tends to rotate with respect to the stationary sheave plate under differing loads on the belt.

At the outer end of the thrust bearing 31, a thrust washer 35 is also provided and this is a wear washer than can be replaced if desired. The washer 35 is merely pressed onto the small shoulder or lip defined on the outer end of the thrust bearing 31. This thrust washer 35 is a hardened wear washer, while the thrust bearing itself can be made out of other suitable materials. It should also be noted that wear shoes indicated at 36 are provided at the ends of the ribs 22A and have surfaces 33 and 34 defined thereon, and these wear shoes 36 can be replaced if they tend to wear out.

The spring 25 resists a compression in axial direction of the clutch from the outer end toward the sheave plate 15, and therefore tends to bear against the washer 32 and bearing 31 to urge the movable sheave plate away from the stationary sheave plate. The bearing 31 and washer 32 will slide on the outer surface of the hub portion 23. Thus, when the clutch is not rotating, the sheave will move to position as shown in FIG. 3 with the belt 17 down against the surface 16A and there will be no driving of the belt 17.

Any movement axially of the movable sheave 20 toward stationary sheave 15 will be resisted by compression of the spring 25 acting against the bearing 31 and washer 32. The axial movement of the movable sheave plate 20 is controlled by pivoting arms that are responsive to centrifugal force. As shown, a clutch cover assembly illustrated generally at 40 is triangular shaped, and has a tapered recess 41 that mounts on the outer surface of the end of hub portion 23. The end of hub 23 and the inner surface of the recess 41, have matching tapers, so that the clutch cover 40 is held in place with a cap screw 42 that is threaded into the interior of the end portion of the hub 23 as shown. The cap screw 42 has a center opening through which the cap screw 14 slidably extends. The cap screw 14 then is threadably mounted onto the end of the engine shaft 12. The clutch cover is thus held fixed in axial position with respect to the hub 11 and is driven with the hub. The clutch cover therefore, will rotate with the stationary sheave plate 15, and will not twist or rotate with respect thereto. The clutch cover moves with the hub 11 because of the tapered connection.

The clutch cover has three bosses 43 which extend radially from the center thereof, and each of these bosses 47 has an interior slot indicated at 44 on the inside thereof. The slots 44 are each of size to receive an arm 45 that is pivotally mounted on a suitable bolt or pin 46. The pivot axes of the arms are at right angles to the rotational axis of the clutch assembly. Suitable weight members 47 are attached to the arms 47 adjacent first ends thereof. The weights 47 are at the ends of the arms adjacent sheave plate 20, and the actuator ends of the arms indicated at 48 carry pivotally mounted wear shoes 49 which have flat surfaces engaging the thrust washer 35. These pivotal shoes 49 provide a flat surface that rides against the thrust washer. The shoes are free to pivot at the mounting to the arms and the arms 45 are free to pivot about pins 46.

In addition, the clutch cover 40 is provided with spiral ramps or cams indicated at 50 on the interior thereof. These ramps or cams 50 comprise part annular walls that commence adjacent the inner surface of the hub cover as at 51, and then taper out in axial direction as they extend annularly to form cams extending toward the stationary sheave portion 15 when the clutch cover is mounted in place. Referring to FIG. 4, it can be seen the spiral or cam walls 50 extend from the lines 51 where they join the inner surface of the clutch cover, and extending counter clockwise in FIG. 4, terminate at end lines 52, each of which is adjacent one of the arms 45. The cams or ramps extend axially to the end lines at 52 shown in FIG. 5 wherein it can be seen that the lines 52 are slightly outside of a plane defined by the outer peripheral edge 56 of the clutch cover 40. Also, in the sectional view of FIG. 5, the starting lines 51 of one of the cams 50 can be seen. The cams are shown in FIG. 5 and in position against surfaces 34 on ribs 22A and are shown actuating the movable sheave portion approximately one half of the total travel of the cams. The cams 50 engage the ends of the ribs 22A. When the clutch is in rest position, the ends of the ribs 22A would be positioned back adjacent the line 51 of each of the cams (there are three ribs and three cams). Any differential rotational movement in the proper direction between the movable sheave plate 20 and the stationary sheave portion 15, (which is resisted by the spring 25) will result in a tendency to force the movable sheave plate 20 toward the stationary sheave plate 15, becasue the end ramp or cam surfaces 34 of the ribs 22A would tend to ride up on the mating edge surfaces of the cams or ramps 50. This would tend to wedge the movable sheave plate in toward the stationary sheave 15, and increase the effective driving diameter of the clutch sheave. The differential in rotation between the sheave plate 15 and plate 20 is caused by torque supplied by the engine. The spring 25 drives from hub to plate 16, and when the engine is initially started the belt is not driving, but rather rides down on the surface 16A. As the engine is accelerated the arms 45 start to act on the washer 35 to move the hub 22 and sheave plate 20 toward the stationary plate 15 because of the centrifugal force on the weights 47 acting through the arm pivot pin 46. The "pick up" speed is determined by the tension of spring 25 resisting compression of the spring as well as the configuration or geometry of arms 45 and the mass of weights 47. As the belt 17 starts to pick up load, there will be a tendency of the sheave plate 15 to rotate farther than the plate 20. The differential in movement will also tend to force the movable plate 20 toward the stationary plate 15. The ends of spring 25 will be twisted so the spring 25 will be loaded in torsion. The axial force on the hub 22 and sheave plate 20 will force the belt outwardly. Desirably the axial force on the movable plate 20 at full governed rpm will be about evenly divided between the arms 45 and the ramps 50.

The centrifugal force actuation of the clutch is achieved by pivoting of the arms 45 about the axis 46, under the centrifugal force developed by the weights 47. The ends 48 of the arms 45 and the shoes 49 bear against the thrust washer 35 and as the force increases from a speed increase, the shoes push the movable sheave plate 20 axially toward the fixed sheave plate 15. The faster the clutch is rotating, which is also the engine shaft speed, the greater the centrifugal force on the weights 47 tend to pivot the arms 45, and, therefore, the greater the output speed will also be because the clutch sheave will have a larger effective driving diameter.

By using the ramps, the weights 47 can be made lighter. At full governed rpm the weights will be developing their full axial force and the weights will tend to control the engine speed at a set speed. If the load on the belt 17 increases the sheave plates tend to separate. The separating load is resisted by the ramps and by the arms 45, in a co-operative effort. The increase in tension of belt 17 tends to cause a downshift and the ramps will permit the movable sheave plate to back off even if the force from the arms 45 does not decrease. This action aids in keeping the engine speed at a governed or constant rpm and thus operation at maximum power even during increased loading of the belt 17. The angle of the ramp surfaces 34 also should be selected to achieve desired division of carrying of the axial load on the movable sheave. The lower angle of the ramp surfaces 34 with respect to a plane normal to the axis of the clutch, the more influence the ramps and spring will have on the position of the movable sheave plate, and thus the more torque responsive the clutch becomes, and the less speed responsive. The higher the angle of the surfaces 34 (the closer the surfaces 34 become to being parallel to the axis of rotation of the shaft) the less influence the ramps have, and the clutch starts to act like an ordinary centrifugal clutch and less and less torque sensitive. The tension and rate of spring 25 can also be selected to provide the pick up speed and the response desired. The spring 25 is loaded both in torsion and compression.

Therefore, a combination of a torque sensitive and speed sensitive clutch is achieved. The centrifugal force actuator further includes wear shoes that can be adapted to any centrifugal clutch that uses arms bearing against a surface to provide for a greater wearing surface and prevent the wearing of grooves or depressions in the thrust surfaces from the ends of the arms. In ordinary clutches the arms will tend to flatten when a conventional curved arm end surface is used. The primary purpose of a clutch of this type is to permit the reliable operation of the engine at its peak horsepower. When the power peak of the engine reduces, for example from running at an increased elevation, the power peak is at approximately the same rpm. With the present clutch the ramps will permit the sheave to back off slightly because of lower torque being carried, while the engine will operate at its desired rpm without changing the weights 47. In conventional governor or speed sensitive clutches the larger weights used at lower elevation will force the drive sheave to its maximum drive diameter and with normal torque converters will not work because the power being produced by the engine will drop and the clutch will not back off enough when the engine is loaded for satisfactory operation. In most conventional centrifugal V-belt sheave clutches, the centrifugal weights have less mass for higher elevations.

In the device as shown, the surfaces 34 form an included angle of about 37° with respect to a plane perpendicular to the axis of the clutch and passing through washer 35. The clutch disclosed works well with an engine having a fairly "peaky" torque curve. Also the power curve of an engine used with the clutch as shown comes at a speed greater than the speed at which maximum torque is developed. Thus, if the speed of the engine drops, its developed torque goes up slightly and this will tend to affect the position of the hub on ramp 50.

In engines with fairly flat torque curves, a higher angle of ramp surface is generally better so that the clutch is less torque responsive, but still the clutch has some torque response as well as speed response.

The clutch parameters can be varied quite widely to suit different engines and load conditions. However, the force necessary to hold the movable sheave in its driving position will be shared by the centrifugal force generating means and the torque responsive ramp surfaces.

What is claimed is:

1. A clutch for driving a V-belt, said clutch having a mounting hub rotatable about an axis of rotation, a first sheave side portion fixed to said mounting hub, a second movable sheave side portion axially slidably mounted on said mounting hub, and also mounted for rotation with respect to said first sheave side portion about said axis of rotation, centrifugal force responsive means to actuate said second movable side portion in a direction along said axis of rotation with respect to said first side portion to create an axial force on said second movable side portion tending to move it toward said first side portion at a selected rotational speed of said clutch, and cam means operable between said hub and said second movable side portion to move to create an axial force independent of said centrifugal force responsive means tending to move said second movable side portion toward said first side portion of said sheave upon differential rotational movement between said second and said first sheave side portions occasioned by a tendency of said second movable side portion to rotate about said axis with respect to said first sheave side portion, said cam means comprising a plurality of circumferentially extending ramps fixedly mounted with respect to said hub on an opposite side of said second movable side portion from said first side portion, said ramps extending circumferentially and tapering in a direction along said axis of rotation toward said first side portion as the ramps extend circumferentially and in a rotational direction opposite from the normal direction of rotation of said hub, and tapered ramp surfaces on said second movable portion adpated to engage and slide against said circumferential ramps on said hub portion so that upon differential rotational movement of said second movable side portion and said first side portion in a rotational direction opposite from the direction of rotation of said hub, said second movable portion will be forced in a direction along the axis of rotation of said hub toward said first side portion.

2. The combination as specified in claim 1 and a spring connecting said second movable sheave side portion and said first sheave side portion to resiliently resist relative rotational movement between said side portions.

3. The combination as specified in claim 1 wherein said centrifugal force responsive means comprises an arm having first and second ends, said arm being pivotally mounted with respect to said hub between said first and second ends, said arm having weight means at said first end tending to pivot said second end of said arm in a direction axially along said hub, and sliding shoe means pivotally mounted to said second end of said arm, said shoe means having a flat surface engaging a surface of said hub to provide a large contact area between said shoe means and said surface of said hub.

4. The combination as specified in claim 3 wherein said surface of said hub comprises a hardened thrust washer against which said shoe means mount.

5. The combination as specified in claim 2 wherein said spring means comprises a helical spring having first and second ends, a first end of said spring being nonrotationally attached to said hub, said helical spring surrounding a portion of said hub, means connecting said second end of said spring to said second side portion in a manner to restrain relative rotational movement of said second side portion with respect to said spring, but permitting sliding movement of said second side portion with respect to said spring in a direction along said axis of said hub.

6. A clutch for driving a V-belt, said clutch having a mounting hub rotatable about an axis of rotation, a first sheave side portion fixed to said mounting hub, a second movable sheave side portion axially slidably mounted with respect to said mounting hub and having an annular surface on one end thereof, and also being mounted with respect to the hub for rotation relative to said first sheave side portion about said axis of rotation, centrifugal force responsive means to actuate said second movable side portion in a direction along axis of rotation with respect to said first side portion to create an axial force on said second movable side portion tending to move it toward said first side portion when the hub is rotating at a selected rotational speed, said centrifugal force responsive means comprising an arm having first and second ends, said arm being pivotally mounted with respect to said hub between said first and second ends, said arm having weight means at said first end tending to pivot said second end of said arm in a direction axially along said hub, sliding shoe means pivotally mounted to said second end of said arm about an axis substantially parallel to the axis of pivoting between said arm and said hub, said shoe means having a flat surface engaging said annular surface of said movable sheave side portion to provide an area of contact between said shoe means and said annular surface, and cam means operable between said hub and said second movable side portion to create an axial force independent of said centrifugal force responsive means tending to move said second movable side portion toward said first side portion of said sheave upon differential rotational movement between said second and said first sheave side portions occasioned by a tendency of said second movable sheave side portion to rotate about said axis of rotation with respect to said first sheave side portion.

7. A clutch having a mounting hub rotatable about an axis of rotation, a first sheave side portion fixed to said mounting hub, a second movable sheave side portion axially slidably mounted on said mounting hub and having an annular surface substantially perpendicular to said axis of rotation, centrifugal force responsive means to actuate said second movable side portion in a direction along said axis of rotation with respect to said first side portion to create an axial force on said second movable side portion tending to move it toward said first side portion at a selected rotational speed, said centrifugal force responsive means comprising an arm having first and second ends, said arm being pivotally mounted with respect to said hub between said first and second ends, said arm tending to pivot to move said second end of said arm in a direction axially along said hub from centrifugal force on said arm developed by rotation of said hub, and sliding shoe means pivotally mounted to said second end of said arm about an axis substantially parallel to the axis of pivot between the arm and hub, said shoe means having a flat surface engaging said annular surface of said second sheave side portion to provide a large contact area between said shoe means and said annular surface.

8. A clutch for driving a V-belt, said clutch having a mounting hub rotatable about an axis of rotation, a first sheave side portion fixed to said mounting hub, a second movable sheave side portion axially slidably mounted with respect to said mounting hub and having a surface portion generally normal to the axis of rotation facing away from the first sheave side portion, and also being mounted with respect to the hub for rotation relative to said first sheave side portion about said axis of rotation, centrifugal force responsive means to actuate said second movable sheave side portion in a direction along axis of rotation with respect to said first side portion to create an axial force on said movable side portion tending to move it toward said first side portion when the hub is rotating, said centrifugal force responsive means comprising a weight actuated arm having an end adjacent the surface portion, and biased toward the surface portion under centrifugal force, shoe means pivotally mounted to said end of said arm about an axis substantially parallel to said surface portion, said shoe means having a flat surface engaging said surface portion of said movable sheave side portion to provide an area of contact between said shoe means and said surface portion, and cam means operable between said hub and said second movable side portion to create an axial force independent of said centrifugal force responsive means tending to move said second movable side portion toward said first side portion of said sheave upon differential rotational movement between said second and said first sheave side portions occasioned by a tendency of said second movable sheave side portion to rotate about said axis of rotation with respect to said first sheave side portion.

9. A clutch having a mounting hub rotatable about an axis of rotation, a first sheave side portion fixed to said mounting hub, a second movable sheave side portion axially slidably mounted on said mounting hub and having a surface portion substantially perpendicular to said axis of rotation, centrifugal force responsive means to actuate said second movable sheave side portion in a direction along said axis of rotation with respect to said first sheave side portion to create an axial force on said second movable sheave side portion tending to move it toward said first sheave side portion at a selected rotational speed, said centrifugal force responsive means comprising a weight actuated arm having an end biased to move in a direction toward and engage said surface portion from centrifugal force on said arm developed by rotation of said hub, and sliding shoe means pivotally mounted to said end of said arm about an axis substantially perpendicular to the axis of rotation, said shoe means having a surface area engaging and mating with said surface portion of said second sheave side portion to provide a large contact area between said shoe means and said surface portion.

* * * * *